United States Patent
Sträb et al.

[11] Patent Number: 6,095,698
[45] Date of Patent: Aug. 1, 2000

[54] HYBRID CONNECTOR

[75] Inventors: Martin Sträb, Diessen; Marcus Schulte, München; Richard Flieger, Stammham; Michael Roth, München; Ernst Liebich, Geltendorf; Werner Bittner, Nürnberg, all of Germany

[73] Assignee: Siemens Aktiengesellschaft, Munich, Germany

[21] Appl. No.: 09/131,808

[22] Filed: Aug. 10, 1998

[30] Foreign Application Priority Data

Aug. 8, 1997 [DE] Germany ............... 197 34 435

[51] Int. Cl.$^7$ .......................................... G02B 6/36
[52] U.S. Cl. ........................... 385/88; 385/92; 385/53
[58] Field of Search ..................... 385/53, 88, 92

[56] References Cited

U.S. PATENT DOCUMENTS

| | | | |
|---|---|---|---|
| 4,993,803 | 2/1991 | Suverison et al. | 385/88 |
| 5,325,454 | 6/1994 | Rittle et al. | 385/76 |
| 5,852,257 | 12/1998 | Dittman et al. | 385/88 |

FOREIGN PATENT DOCUMENTS

| | | |
|---|---|---|
| 36 04 548 C2 | 12/1991 | Germany. |
| 195 33 295 C1 | 4/1997 | Germany. |

*Primary Examiner*—Rodney Bovernick
*Assistant Examiner*—Ellen E. Kim
*Attorney, Agent, or Firm*—Herbert L. Lerner; Laurence A. Greenberg; Werner H. Stemer

[57] ABSTRACT

A hybrid connector with electric plug-in connections and fiber-optic demountable connections for an electronic built-in unit. The hybrid connector has a female connector and an angular male connector strip having long side walls. The female connector has a cover cap with module chambers for holding electric receptacle modules and fiber-optic modules. Electrooptical transducers having connecting leads with ends defining solder terminals are assigned to the fiber-optic connectors of the fiber-optic modules. The electrooptical transducers are disposed in a base of the angular male connector strip. The electrooptical transducers are aligned in a row parallel to the long side walls on a side on which solder terminals of the male connector strip are located. In this manner, the length of the connecting leads including the solder terminals is as small as possible.

14 Claims, 5 Drawing Sheets

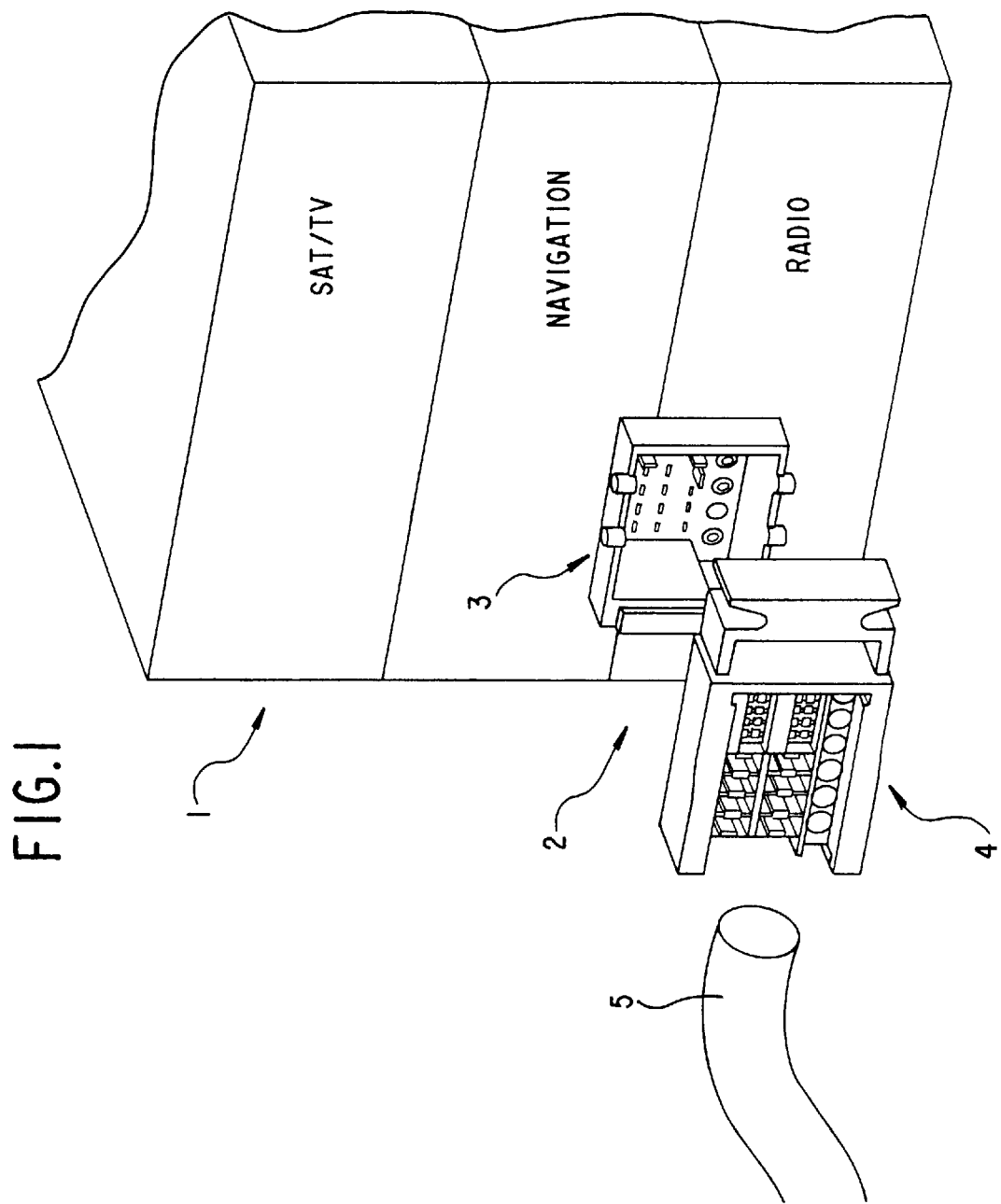

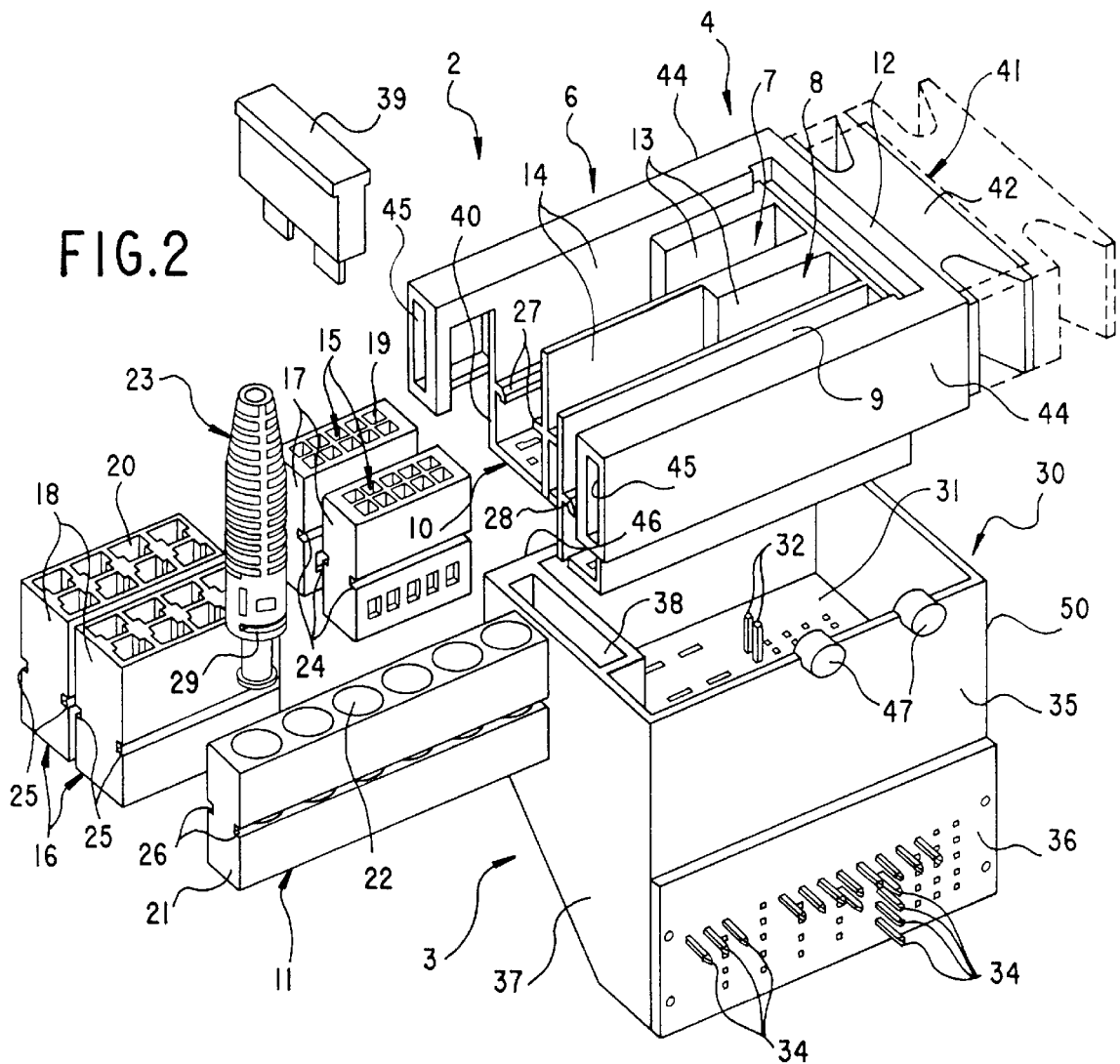
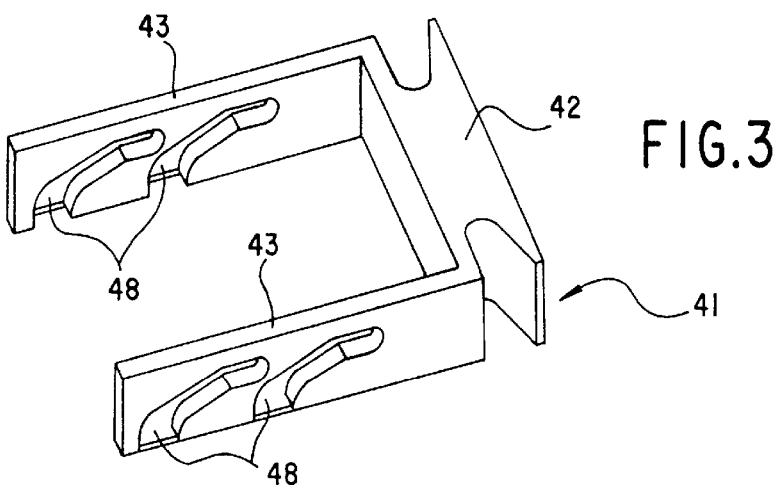

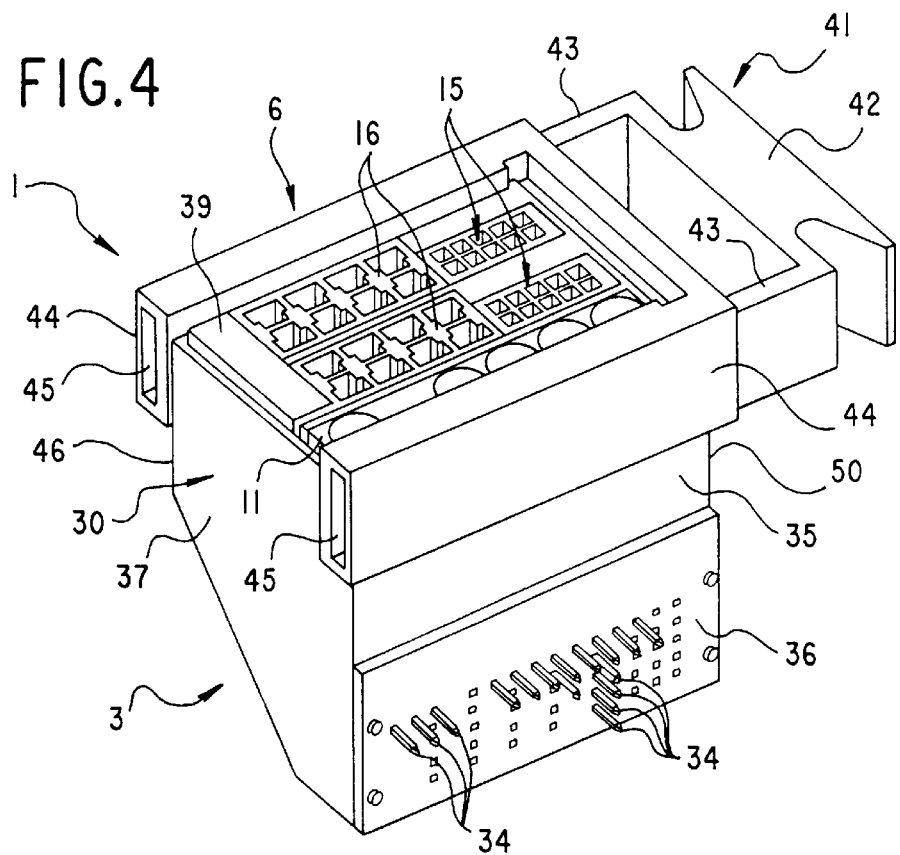
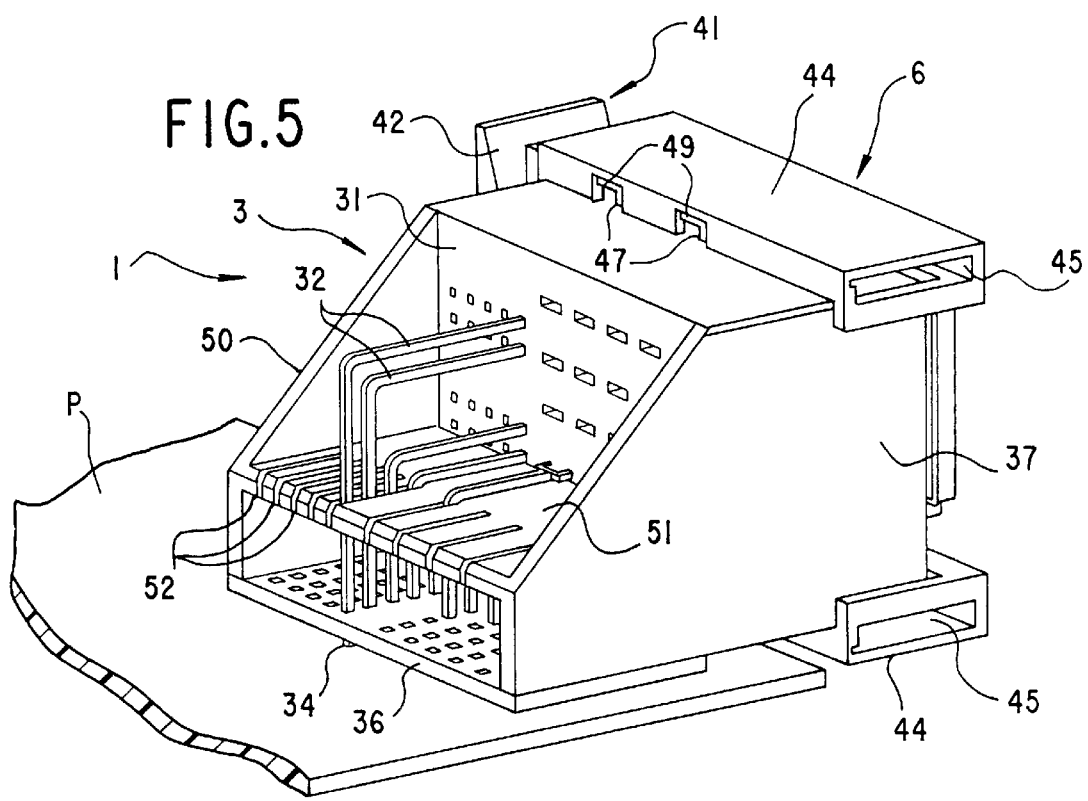

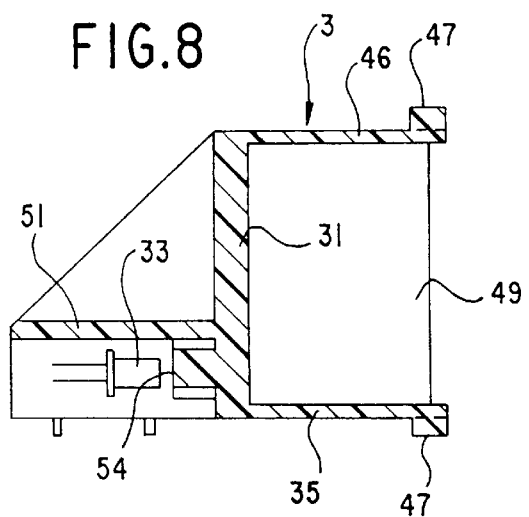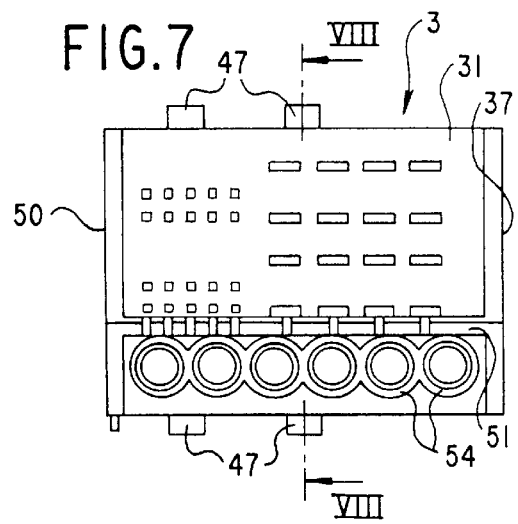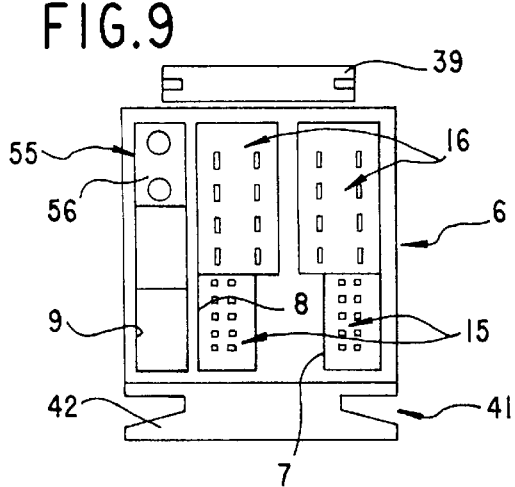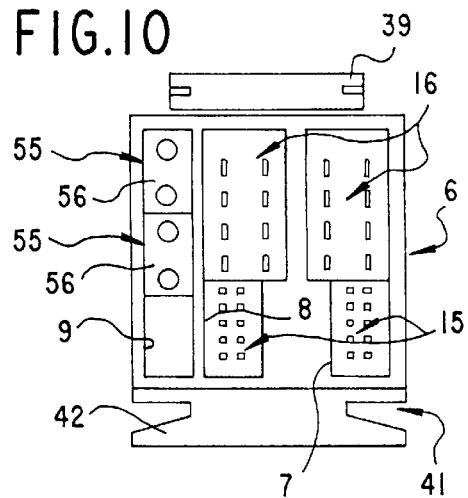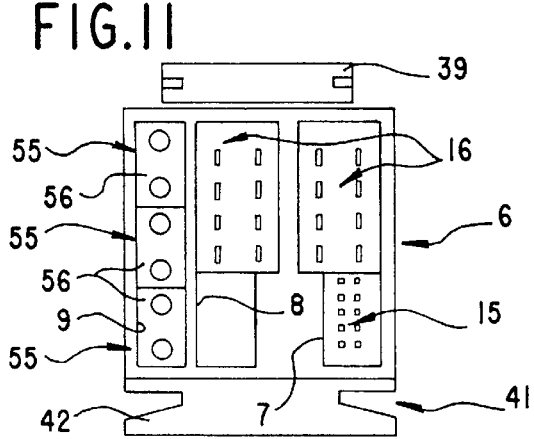

1

HYBRID CONNECTOR

BACKGROUND OF THE INVENTION

Field of the Invention

The invention relates to a hybrid connector having electric plug-in connections and fiber-optic demountable connections for an electronic built-in unit. In particular, the invention relates to a vehicle radio which can include other multimedia. The hybrid connector has a male connector strip, with a plug-in collar, and a female connector which can be plugged into the plug-in collar of the male connector strip. The female connector includes a cover cap with module chambers for holding electronic receptacle modules and fiber-optic modules. The male connector strip has contact pins, held in a base of the male connector strip, which are assigned, with their ends on the plug-in collar side, to receptacles of the receptacle modules. Optoelectric transducers, likewise are held in the base of the male connector strip, and are assigned to the optical fiber connections of the fiber-optic modules, and in which the ends, guided outward from the male connector strip, of the contact pins and of the electric connecting leads of the optoelectric transducers are solder terminals of the male connector strip. Modular hybrid connectors of this type are known from German Patent DE 195 33 295 C1. The modular configuration allows the connector to be adapted to different equipment-specific requirements of extendable electronic built-in units by appropriately fitting them with receptacle modules and fiber-optic modules. Of particular importance in this case are automobile radios which are optionally combined with a mobile satellite television set and/or with a mobile navigation unit to form an electronic built-in unit. In addition to the usual electric plug-in connections, the large amount of information arriving in this case also requires fiber-optic demountable connections. In such units the connector fiber-optic signal currents must be converted by electrooptical transducers into electric signal currents and vice versa. With the known hybrid connector according to German Patent DE 195 33 295 C1, the electrooptical transducers are accommodated in mating fiber-optic modules which, for their part, are in turn inserted into shaft-like recesses in the base of the male connector strip. Apart from the fact that the configuration is relatively complicated in terms of production engineering, it results, given a prescribed number of fiber-optic terminals, in relatively large dimensions for such a connector. The electrooptical transducers formed of transmitting and receiving diodes additionally require relatively long connecting leads to the solder terminals assigned to them on the printed circuit board of the electronic built-in unit. With regard to the high signal frequencies to be transmitted via the connecting leads, the length of the latter must be at most 20 mm if the aim is to avoid undesired transfers and signal distortions. The observance of this maximum length is made difficult, in particular, by the fact that the male connector strip of the connector usually cannot be seated on the printed circuit board of the electronic built-in unit for and fasted thereto. In general, the plug-on collar is aligned perpendicular to the plane of the printed circuit board because a lateral plug-in connection is generally prescribed for such electronic built-in units. In order to arrive at solutions which are acceptable for radio frequencies, it is then necessary to use an intermediate printed circuit board. The intermediate printed circuit board is attached to the male connector strip and in the case of which those electronic connecting components on the printed circuit board of the electronic built-in unit which are to be connected directly to the terminals of the electrooptical transducers, must be relocated to the intermediate printed circuit board.

SUMMARY OF THE INVENTION

It is accordingly an object of the invention to provide a hybrid connector which overcomes the above-mentioned disadvantages of the prior art devices of this general type, which manages, on the one hand, with minimum dimensions for a prescribed maximum number of poles and, on the other hand, without an intermediate printed circuit board.

With the foregoing and other objects in view there is provided, in accordance with the invention, in combination with an electronic built-in unit having a printed circuit board with an edge and solder hole terminals formed therein, a hybrid connector having electric plug-in connections and fiber-optic demountable connections, including: electric receptacle modules having receptacles; fiber-optic modules having optical fiber connectors; an angular male connector strip has long walls and a plug-in collar with a plug-in collar side and a base; contact pins having ends held in the base, the ends of the contact pins protrude from the plug-in collar side of the plug-in collar and engage the receptacles of the electric receptacle modules; optoelectric transducers having electrical connecting leads with ends held in the base, the ends of the electrical connecting leads engage the optical fiber connectors of the fiber-optic modules, the ends of the contact pins and the ends of the connecting leads protrude outward from the male connector strip and are solder terminals of the male connector strip, and the solder terminals are to be directly soldered in the solder hole terminals on the edge of the printed circuit board of the electronic built-in unit; the optoelectric transducers disposed in a row parallel to the long walls on a side in the base where the solder terminals reside for assuring that a length of the connecting leads including the solder terminals is as small as possible; and a female connector for plugging into the plug-in collar, the female connector having a cover cap with module chambers for receiving and holding the electric receptacle modules and the fiber-optic modules.

The invention is based on the finding that even in the case of an angular male connector strip which is configured to have dimensions which are as small as possible in the case of a prescribed number of poles, the length of the connecting leads for the transmitting and receiving diodes can be limited in an exceptionally advantageous way to at most 20 mm if the electrooptical transducers are disposed in the way specified, with the omission of mating fiber-optic modules in the base of the angular male connector strip.

Considerable compressive and tensile forces have to be applied in the case of multi-pole connectors when the plug-in connection is made and disconnected. In order to remedy this, it is known, for example, from the German Patent DE 36 04 548 C2 to make use of plug-in aids in the form of slotted slides. As a development of the invention, use is made of a plug-in aid being a sliding bow which has a U-shaped frame and a grip head and is guided and held by way of its frame limbs in slit-shaped slotted guides on both long sides of the cover cap.

In accordance with an added feature of the invention, the length of the connecting leads of the optoelectrical transducers including the solder terminals is at most 20 mm.

In accordance with an another feature of the invention, there is a threading plate aligned perpendicular to the base and fastened to the angular male connector strip, the solder terminals are held in the threading plate, and the threading plate is to be seated on the printed circuit board.

In accordance with an additional feature of the invention, the cover cap has long sides and the long sides are aligned, in an interconnected state of the cover cap with the angular male connector strip, parallel to the long walls of the angular male connector strip; at least two of the module chambers extend parallel to the long sides of the cover cap; the cover cap has a front transverse side and a rear transverse side defining front and rear walls of the module chambers, the front transverse side has an opening formed therein defining an open end of the module chambers to allow for an insertion of the electric receptacle modules and the fiber-optic modules into the module chambers; and the module chambers have a rear sub-region and a front sub-region each with a chamber formed therein, the chamber of the rear sub-region have at east one of a smaller chamber length and a chamber width than a chamber length and a chamber width of the front sub-region, the rear sub-region receives one of the electric receptacle modules constructed for smaller current demands with regard to the receptacles, and the front sub-region receiving another of the electric receptacle modules having larger current demands with regard to the receptacles.

In accordance with a further added feature of the invention, the module chambers are three mutually parallel module chambers, two of the three mutually parallel module chambers are identical module chambers for holding the electric receptacle modules and one of the mutually parallel module chambers is configured for holding the fiber-optic modules.

In accordance with a further additional feature of the invention, the module chambers have long sides and guide webs disposed along the long sides, the electric receptacle modules and the fiber-optic modules have housings with long sides and guide groves formed therein along the long sides, and the electric receptacle modules and the fiber-optic modules are guided and held in the guide webs of the module chambers by way of the guide grooves.

In accordance with yet another feature of the invention, the guide grooves and the guide webs interlock upon insertion of the electric receptacle modules and the fiber-optic modules into the module chambers, and simultaneously provide a secondary safeguard for the receptacles and the optical fiber connectors held in the electric receptacle module housings and the fiber-optic module housings, respectively.

In accordance with yet another added feature of the invention, there is a flat connection safeguard and a plug-in pocket with receptacles for receiving the flat connection safeguard, the angular male connector strip has two transverse walls each with an interior plug-in collar side, the plug-in pocket is disposed on the interior plug-in collar side of one of the two transverse walls, the receptacles of the plug-in pocket have terminals protruding outward from the angular male connector strip and functioning as the solder terminals.

In accordance with yet another additional feature of the invention, the front transverse side of the cover cap has a cutout formed therein for receiving the plug-in pocket; and the plug-in pocket for the flat connection safeguard disposed in a region of the plug-in collar on the interior plug-in collar side of the transverse wall covers the open end of the module chambers if the cover cap is interconnected with the angular male connector strip.

In accordance with an added feature of the invention, the fiber-optic modules are dimensioned for holding two fiber-optic connectors, and at most three of the fiber-optic modules having identical dimensions are disposed one behind another in one of the module chambers.

In accordance with an additional feature of the invention, the fiber-optic modules are a single fiber-optic module having a plurality of the optical fiber connectors disposed in a row one behind the other and disposed in one of the module chambers.

In accordance with another feature of the invention, the single fiber-optic module contains between two and six optical fiber connectors.

In accordance with another added feature of the invention, the cover cap has long sides with slit shaped slotted guides formed therein and a plug-in aid, the plug-in aid including a sliding bow with a U-shaped frame and a grip head, the U-shaped frame has frame limbs with guide grooves formed therein, the plug-in aid is guided and held by way of the frame limbs in the slit-shaped slotted guides of the long sides of the cover cap; the sliding bow has a final latching position if in a fully inserted state in the cover cap and a preliminary latching position if in a state where the sliding bow can be partially withdrawn from the cover cap; the long walls of the angular male connector strip each have an upper edge with integrally formed guide pins facing the cover cap, upon insertion of the cover cap with the sliding bow in the preliminary latching position, the guide grooves of the frame limbs of the sliding bow engage the guide pins; and the guide grooves of the frame limbs of the sliding bow are shaped to allow movement of the cover cap into and out of the plug-in collar of the angular male connector strip if the sliding how is moved to and fro between the preliminary latching position and the final latching position.

In accordance with a concomitant feature of the invention, the electronic built-in unit is a motor vehicle radio extendable to incorporate other multimedia.

Other features which are considered as characteristic for the invention are set forth in the appended claims.

Although the invention is illustrated and described herein as embodied in a hybrid connector, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a fragmentary, perspective view of an electronic built-in unit having a hybrid connector for a vehicle according to the invention;

FIG. 2 is an exploded, perspective view of the hybrid connector;

FIG. 3 is a perspective view of a sliding bow provided in a cover cap of the hybrid connector;

FIG. 4 is a top perspective view of the hybrid connector;

FIG. 5 is a side perspective view of the hybrid connector;

FIG. 7 is a plan view of an underside of a base of an angular male connector strip of the hybrid connector;

FIG. 8 is a cross-sectional view along the line VIII—VIII of FIG. 7 showing the angular male connector strip of the hybrid connector; and FIGS. 9–11 are plan views of different module fittings of the cover cap of the hybrid connector.

DESCRIPTION OF THE PREFERRED EMBODIMENTS

Figure 6:
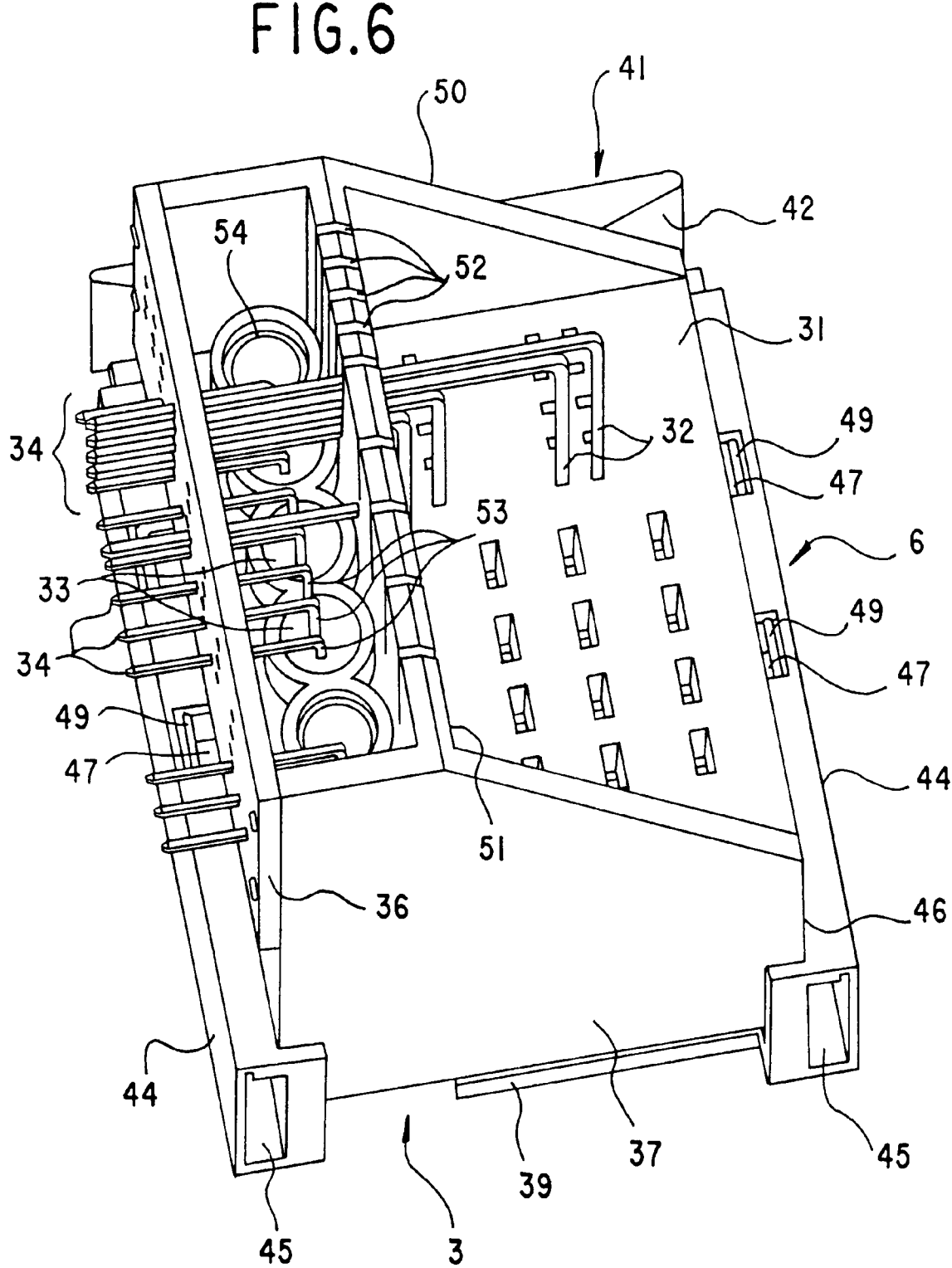
FIG. 6 is a bottom perspective view of the hybrid connector.

Referring now to the figures of the drawing in detail and first, particularly, to FIG. 1 thereof, there is shown an electronic built-in unit 1 for an automobile. The electronic built-in unit 1 includes subassemblies stacked directly one above another and assigned to one another, specifically a radio RAD, a mobile navigation system NAV and a mobile satellite television receiver SAT/TV. Of course, the navigation system NAV and the satellite television receiver SAT/TV may also be located in other areas of the automobile, and having connecting lines so as to be remote from the radio RAD. In order to simplify the installation of the electronic built-in unit 1 in the automobile, and for reasons of space, all of the terminal connections for the electronic built-in unit 1 are concentrated in a hybrid connector 2 whose angular male connector strip 3 is a permanent constituent part of the radio RAD of the electronic built-in unit 1 and into which the female connector 4, which is connected to a flexible connecting lead 5 is plugged.

The configuration of the hybrid connector 2, which is specified in rough outlines in FIG. 1 and represents a preferred exemplary embodiment, as well as its various components are further shown in FIG. 2. The female connector 4 includes a cover cap 6 with three module chambers 7, 8 and 9, which are open upward and at a front transverse side 10. The module chamber 9, which has the same chamber width over its entire chamber length, holds a fiber-optic module 11. Between the front transverse side 10 and a rear transverse side 12 of the cover cap 6, the identically shaped module chambers 7 and 8 have two sub-regions of different chamber lengths and chamber widths, specifically a rear subregion 13 of smaller chamber length and chamber width, and a front subregion 14 of larger chamber length and chamber width. The rear sub-region 13 of the module chambers 8 and 9 is provided in each case for holding a receptacle module 15 having smaller current requirements, and the front sub-region 14 is provided in each case for holding a receptacle module 16 having larger current needs.

Receptacle module housings 17 of the receptacle modules 15 and receptacle module housings 18 of the receptacle modules 16 have holding shafts 19 and 20, respectively, which are disposed in a double array and in which the receptacles (not represented) are held. In a corresponding way, a fiber-optic module housing 21 is provided with holding bores 22, disposed in a row, for fiber-optic connectors 23, of which one is represented in FIG. 2 without optical fibers. Guide grooves 24 and 25 are provided on both outer long sides of the receptacle module housings 15 and 16, respectively. Guide grooves 26 are provided in a corresponding way on both outer long sides of the fiber-optic module housing 21. On both long sides of the module chambers 8 and 9, guide webs 27 are assigned to the guide grooves 24 and 25 of the receptacle module housings 15 and 16, respectively. In the same way, the guide grooves 26 of the fiber-optic module housing 21 are assigned guide webs 28 on both long sides of the module chambers 9. When the receptacle modules 15 and 16 are inserted into the module chamber 7 and 8 and the fiber-optic module 11 is inserted into the module chamber 9, the mutually assigned guide grooves and guide webs engage in one another. As a result, the receptacle modules 15 and 16 as well as the fiber-optic module 11 are guided and held in the module chambers 7, 8 and 9 assigned to them. At the same time, the interengaging guide grooves and guide webs represent a self-closed secondary safeguard for the receptacles in the receptacle modules 15 and 16, and for the fiber-optic connectors 23 in the fiber-optic module 11. This state of affairs is illustrated in FIG. 2 for the fiber-optic module 11, with the aid of the fiber-optic connector 23 represented. The fiber-optic connector 23, which is a plastic part, has grooves 29 on opposite sides of its lower part, which is plugged in a holding bore 22 of the fiber-optic module 11. The grooves 29 ensure that the fiber-optic module 11 can be inserted into the module chamber 9 assigned to it only when the grooves 29 are aligned with the guide grooves 26 in the fiber-optic module 11.

For its plug-in connection with the female connector 4, the angular male connector strip 3 has a plug-in collar 30 and a base 31, which is simultaneously the base of the plug-in collar 30. Contact pins 32 for the receptacles of the receptacle modules 15 and 16 are held in the base 31. Furthermore, also held in the base 31 are electrooptical transducers 33 assigned to the fiber-optic module 11. The transducers 33 are shown in FIGS. 6 to 8 (still to be described). In order to create solder terminals 34, the contact pins 32 and connecting leads 53 (FIG. 6), of the electrooptical transducers 33 are bent off at right angles on the underside of the base 31 and held with their ends constituting the solder terminals 34 in a threading plate 36 attached to a long front wall 35 of the male connector strip 3.

The plug-in collar 30 of the angular male connector strip 3 is provided, on the inside of the front transverse wall 37, with a plug-in pocket 38 for holding a flat connection safeguard (i.e. a fuse) 39, which is provided here for the radio RAD. In a way not visible in FIG. 2, there are provided inside the plug-in pocket 38 for the plugs of the flat connection safeguard 39 two receptacles whose terminals, which are bent off at right angles, are likewise held as solder terminals 34 in the threading plate 36. As a result of this arrangement of the flat connection safeguard 39 for the radio RAD it is achieved in an exceptionally advantageous way that the movement space required for handling the female connector 4 of the hybrid connector 1 is likewise available for handling the flat connection safeguard 39.

The configuration of the flat connection safeguard 39 in the plug-in pocket 38, provided inside the plug-in collar 30, renders it necessary to provide on the front transverse surface 10 of the cover cap 6 a cutout 40 adapted to the dimensions of the plug-in pocket 38. As FIG. 2 shows, the plug-in pocket 38 is disposed inside the plug-in collar 30 on the front transverse wall 37 of the angular male connector strip 3 such that only the module chambers 7 and 8 are thereby somewhat shortened by the cutout 40 in the cover cap 6. Otherwise, with the given dimensions, it would not have been possible to accommodate the fiber-optic module 11 having six fiber-optic connectors 23 in the module chamber 9.

The exemplary embodiment for a 42-pole hybrid connector 2, which is represented in FIGS. 1 and 2, is provided, for the purpose of better handling when connecting and disconnecting the plug-in connection again, with a plug-in aid in the form of a sliding bow 41 which includes a U-shaped frame with a grip head 42. The sliding bow 41 is likewise represented in perspective in FIG. 3. It is guided and held by way of its frame limbs 43 in slit-shaped slotted guides 45 on both long sides 44 of the cover cap 6. The sliding bow 41 on the cover cap 6 is represented in two sliding positions in FIG. 2. FIG. 2 shows it in its final latching position with continuous lines, on the one hand, and in its preliminary latching position with broken lines, on the other hand. So that the sliding bow 41 on the cover cap 6 can act as a plug-in aid, it must have a steady bearing on the angular male connector strip 3. For this purpose, there are integrally formed on the plug-in collar 30, specifically on the upper edge on the long rear wall 46 and on the long front wall 35, guide pins 47 which, upon insertion of the cover cap 6 with the sliding bow 41 in the preliminary latching position, engage in guide grooves 48 in the frame limbs 43 of the sliding bow 41. Because of the oblique configuration of the guide grooves 48 in the frame limbs 43, it is then possible for the cover cap 6 to be moved into and out of the plug-in collar 30 of the angular male connector strip 3 in a force-saving fashion when the sliding bow 41 is moved to and fro between its preliminary latching position and its final latching position.

The hybrid connector 2 is represented once again in FIG. 4 in the state in which its individual parts have been assembled. In this case, the cover cap 6 with the sliding bow 41 in the preliminary latching position is seated on the plug-in collar 30 of the angular male connector strip 3. Insertion of the sliding bow 41 into its final latching position makes the plug-in connection between the cover cap 6 and the angular male connector strip 3. When the angular male connector strip 3 and cover cap 6 have been plugged one into the other, the module chambers 7, 8 and 9, which are open at the front transverse side 10 of the cover cap, are covered by the front transverse wall 37 of the angular male connector strip 3.

The view of the hybrid connector 1 in FIG. 5 shows the underside of the base 31 of the angular male connector strip 3 and of the cover cap 6. Visible on the underside of the cover cap 6, in the region of its slotted guides 45, are openings 49 through which the guide pins 47, which are integrally formed on the upper edge of the plug-in collar 30 of the angular male connector strip 3, engage in the guide grooves 48 in the frame limbs 43 of the sliding bow 41.

Provided between the front transverse wall 37 and a rear transverse wall 50 in a fashion aligned perpendicular to the base 31 is a comb wall 51 with wall slits 52. The contact pins 32, emerging through the comb wall 51 on the underside of the base 31, are guided in the wall slits 52 by way of their parts which are angled off vertically downward. The angled-off parts of the contact pins 32, whose ends form the solder terminals 34, are additionally held in the thread plate 36, which is disposed parallel to the comb wall 51 below the comb wall 51.

As the further view of the hybrid connector 1 shown in FIG. 6, in the sub-region of the base 31 between the comb wall 51 and the threading plate 36, the electrooptical transducers 33, which are assigned to the fiber-optic module 11, are disposed with their connecting leads 53 in tubular structures 54 of the base 31. The connecting leads 53 of the electrooptical transducers 33, whose ends are the solder terminals 34, are likewise angled off vertically downward and held in the threading plate 36. FIG. 6 shows particularly clearly that the configuration, selected in the case of the hybrid connector 2, for the fiber-optic demountable connection, in which the electrooptical transducers 33 are disposed in the base 31 of the angular male connector strip 3, in the immediate vicinity of the threading plate 36, manage with a minimal length for their connecting leads 53 including the solder terminals 34. The length is <20 mm in the case of the exemplary embodiment represented here for a hybrid connector 2. This creates radio-frequency-specific preconditions for the angular male connector strip 3, as represented in FIG. 5, to be seated directly, while dispensing with the intermediate printed circuit board, on the printed circuit board P of the electronic built-in unit 1, at the edge thereof, by way of its threading plate 36. In this case, the angular male connector strip 3 then engages with the solder terminals 34, for the purpose of soldering the latter, in solder hole terminals, which are assigned to the terminals on the printed circuit board P and are not represented in FIG. 5.

FIG. 7 shows as a supplement to FIG. 6 the angular male connector strip 3, without the contact pins 32 and electrooptical transducers 33 being illustrated, in a plan view of the underside of the base 31 with the comb wall 51. The section VIII—VIII specified in FIG. 7 is represented in FIG. 8. Provided on the base 31 at the bottom, on the side of the threading plate (not represented here), is a total of six tubular structures 54 into which six electrooptical transducers 33 constituting transmitting and receiving photodiodes can be inserted. The fitting of the tubular structures 54 with electrooptical transducers 33 is undertaken in each case in correspondence with the fitting of the fiber-optic module 11 with at most six fiber-optic connectors 23.

Finally, FIGS. 9–11 show three more variants of a large number of module fitting possibilities of the hybrid connector 2. The three variants differing from the module fitting of the hybrid connector 2 as shown by FIGS. 2 and 4. FIGS. 9–11 each represent a top plan view of the cover cap 6 with the sliding bow 41 and the flat connection safeguard 39. A fundamental difference from the module fitting of the hybrid connector 2 according to FIGS. 2 and 4 is constituted by fiber-optic modules 55, which have the same dimensions with regard to their fiber-optic module housings 56, provided here for only two fiber-optic connectors 23. In the fitting example according to FIG. 9, use is made of two receptacle modules 15 and 16 and of a fiber-optic module 55. The fitting example according to FIG. 10 differs from this in that two fiber-optic modules 55 are disposed one behind the other in the module chamber 9. In the fitting example according to FIG. 11, three fiber-optic modules 55 are disposed one behind the other in the module chamber 9. Moreover, only one receptacle module 16 is inserted into the module chamber 8. The smallest length dimensions of the cover cap 6 for at most six fiber-optic connectors 23 is achieved when use is made of one fiber-optic module 11. This is because, for production-engineering reasons three fiber-optic modules 55 disposed one behind the other require a larger overall length than one fiber-optic module 11.

We claim:

1. In combination with an electronic built-in unit having a printed circuit board with an edge and solder hole terminals formed therein, a hybrid connector having electric plug-in connections and fiber-optic demountable connections, comprising:

elect ric receptacle modules having receptacles;

fiber-optic modules having optical fiber connectors;

an angular male connector strip having long walls and a plug-in collar with a plug-in collar side and a base;

contact pins having ends held in said base, said ends of said contact pins protruding from said plug-in collar side of said plug-in collar and engaging said receptacles of said electric receptacle modules;

optoelectric transducers having electrical connecting leads with ends held in said base, said ends of said electrical connecting leads engaging said optical fiber connectors of said fiber-optic modules, said ends of said contact pins and said ends of said connecting leads protruding outward from said male connector strip forming solder terminals of said male connector strip, said solder terminal s to be directly soldered in the solder hole terminals on the edge of the printed circuit board of the electronic built-in unit;

said optoelectric transducers disposed in a row parallel to said long walls on a side of said base where said solder terminals reside for assuring that a length of said connecting leads including said solder terminals is as small as possible; and a female connector for plugging into said plug-in collar, said female connector having a cover cap with module chambers for receiving and holding said electric receptacle modules and said fiber-optic modules.

2. The hybrid connector according to claim 1, wherein said length of said connecting leads of said optoelectrical transducers including said solder terminals is at most 20 mm.

3. The hybrid connector according to claim 1, including a threading plate aligned perpendicular to said base and fastened to said angular male connector strip, said solder terminals held in said threading plate, and said threading plate to be seated on the printed circuit board.

4. The hybrid connector according to claim 1, wherein:
said cover cap has long sides and said long sides are aligned, in an interconnected state of said cover cap with said angular male connector strip, parallel to said long walls of said angular male connector strip;
at least two of said module chambers extend parallel to said long sides of said cover cap;
said cover cap has a front transverse side and a rear transverse side defining front and rear walls of said module chambers, said front transverse side has an opening formed therein defining an open end of said module chambers to allow for an insertion of said electric receptacle modules and said fiber-optic modules into said module chambers; and
said module chambers have a rear sub-region and a front sub-region each with a chamber formed therein, said chamber of said rear sub-region has at least one of a smaller chamber length and a chamber width than a chamber length and a chamber width of said front sub-region, said rear sub-region receiving one of said electric receptacle modules constructed for smaller current demands with regard to said receptacles, and said front sub-region receiving another of said electric receptacle modules having larger current demands with regard to said receptacles.

5. The hybrid connector according to claim 4, wherein said module chambers are three mutually parallel module chambers, two of said three mutually parallel module chambers are identical module chambers for holding said electric receptacle modules and one of said mutually parallel module chambers for holding said fiber-optic modules.

6. The hybrid connector according to claim 4, including a flat connection safeguard and a plug-in pocket with receptacles for receiving said flat connection safeguard, said angular male connector strip having two transverse walls each with an interior plug-in collar side, said plug-in pocket disposed on said interior plug-in collar side of one of said two transverse walls, said receptacles of said plug-in pocket having terminals protruding outward from said angular male connector strip and functioning as said solder terminals.

7. The hybrid connector according to claim 6, wherein:
said front transverse side of said cover cap has a cutout formed therein for receiving said plug-in pocket; and
said plug-in pocket for said flat connection safeguard disposed in a region of said plug-in collar on said interior plug-in collar side of said transverse wall covers said open end of said module chambers if said cover cap is interconnected with said angular male connector strip.

8. The hybrid connector according to claim 1, wherein said module chambers have long sides and guide webs disposed along said long sides, said electric receptacle modules and said fiber-optic modules have housings with long sides and guide groves formed therein along said long sides, and said electric receptacle modules and said fiber-optic modules are guided and held in said guide webs of said module chambers by way of said guide grooves.

9. The hybrid connector according to claim 8, wherein said guide grooves and said guide webs interlock upon insertion of said electric receptacle modules and said fiber-optic modules into said module chambers, and simultaneously provide a secondary safeguard for said receptacles and said optical fiber connectors held in said electric receptacle module housings and said fiber-optic module housings, respectively.

10. The hybrid connector according to claim 1, wherein said fiber-optic modules are dimensioned for holding two fiber-optic connectors, and at most three of said fiber-optic modules having identical dimensions are disposed one behind another in one of said module chambers.

11. The hybrid connector according to claim 1, wherein said fiber-optic modules are a single fiber-optic module having a plurality of said optical fiber connectors disposed in a row one behind the other and disposed in one of said module chambers.

12. The hybrid connector according to claim 11, wherein said single fiber-optic module contains between two and six optical fiber connectors.

13. The hybrid connector according to claim 1, wherein
said cover cap has long sides with slit shaped slotted guides formed therein and a plug-in aid, said plug-in aid including a sliding bow with a U-shaped frame and a grip head, said U-shaped frame has frame limbs with guide grooves formed therein, said plug-in aid is guided and held by way of said frame limbs in said slit-shaped slotted guides of said long sides of said cover cap;
said sliding bow has a final latching position if in a fully inserted state in said cover cap and a preliminary latching position if in a state where said sliding bow can be partially withdrawn from said cover cap;
said long walls of said angular male connector strip each have an upper edge with integrally formed guide pins facing said cover cap, upon insertion of said cover cap with said sliding bow in said preliminary latching position, said guide grooves of said frame limbs of said sliding bow engage said guide pins; and
said guide grooves of said frame limbs of said sliding bow are shaped to allow movement of said cover cap into and out of said plug-in collar of the angular male connector strip if said sliding bow is moved to and fro between said preliminary latching position and said final latching position.

14. The hybrid connector according to claim 1, wherein the electronic built-in unit is a motor vehicle radio extendable to incorporate other multimedia.

* * * * *